United States Patent [19]

Lewis

[11] Patent Number: 4,666,055

[45] Date of Patent: May 19, 1987

[54] ELECTRICAL OUTLET BOX WITH POLYGONAL MOUNTING BORE

[75] Inventor: Thomas E. Lewis, South Bend, Ind.

[73] Assignee: Harvey Hubbell Incorporated, Orange, Conn.

[21] Appl. No.: 808,817

[22] Filed: Dec. 13, 1985

[51] Int. Cl.4 .............................................. F16B 39/00
[52] U.S. Cl. ..................................... 220/3.2; 220/3.4; 220/3.5
[58] Field of Search ........................... 173/53, 54, 58; 220/3.2, 3.3, 3.4, 3.5, 3.6, 3.7, 3.8

[56] References Cited

U.S. PATENT DOCUMENTS

| | | | |
|---|---|---|---|
| 2,867,349 | 1/1959 | Parker, Jr. ....................... | 220/3.4 X |
| 3,967,049 | 6/1976 | Brandt ................................ | 173/53 |
| 4,012,580 | 3/1977 | Arnold ............................... | 220/3.2 X |
| 4,071,159 | 1/1978 | Robinson et al. ............... | 220/3.5 X |
| 4,105,862 | 8/1978 | Hoehn ............................... | 220/3.2 X |
| 4,214,667 | 7/1980 | Lass ................................... | 173/53 X |
| 4,265,365 | 5/1981 | Boteler .............................. | 220/3.3 |
| 4,304,958 | 12/1981 | Neff et al. . | |
| 4,580,689 | 4/1986 | Slater ................................ | 220/3.2 |

OTHER PUBLICATIONS

Sample of Carlon Electrical Box.

Primary Examiner—Steven M. Pollard
Attorney, Agent, or Firm—Jerry M. Presson; Alfred N. Goodman; Mark S. Bicks

[57] ABSTRACT

An electrical outlet box formed of nonmetallic material which has a pair of integral bosses that angularly align, engage and retain wiring device mounting screws therein. The bosses each have a through bore for receiving the screws comprising in sequence a frustoconical surface, a cylindrical surface having a diameter slightly larger than the crest diameter of the mounting screw threads, and a self-tapping surface defining a regular hexagon in transverse cross section. The hexagon has a diameter across its corners slightly larger than the crest diameter of the screw threads, and a diameter across its flat sides slightly larger than the root diameter of the screw threads and slightly smaller than the crest diameter of the screw threads.

21 Claims, 7 Drawing Figures

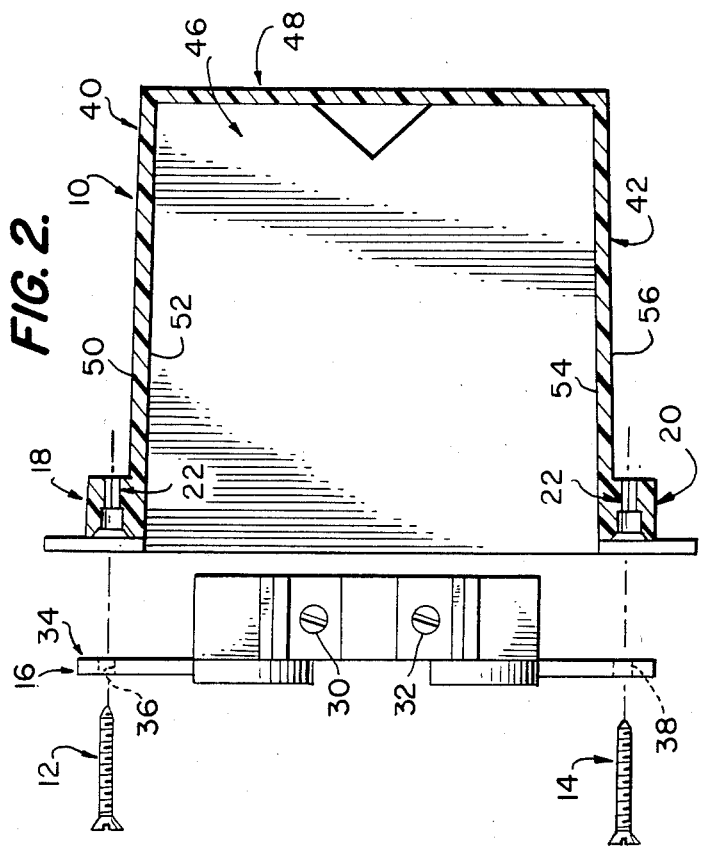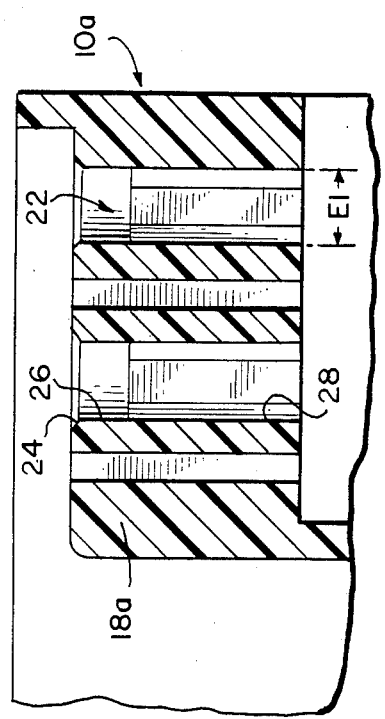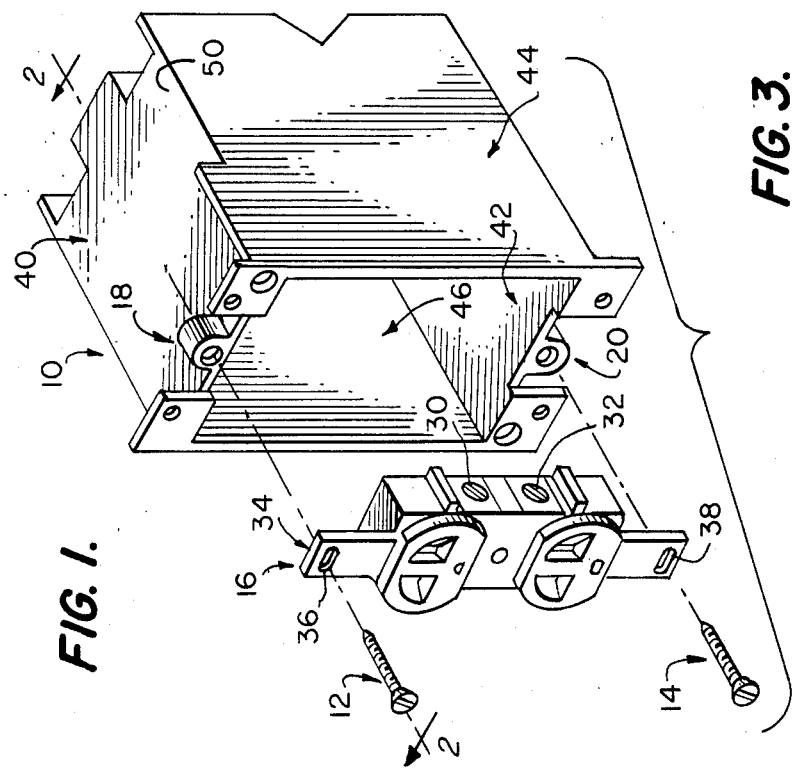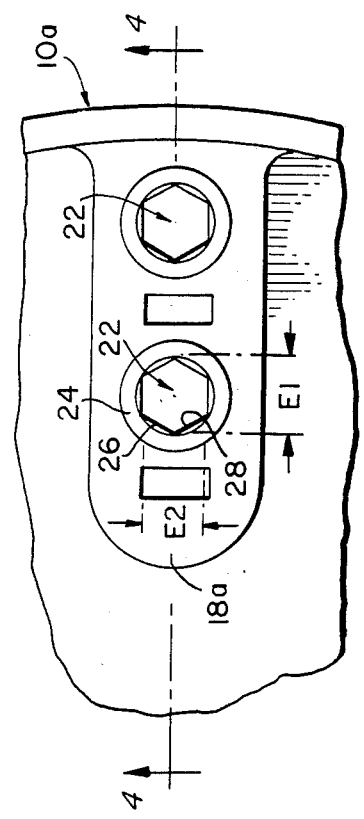

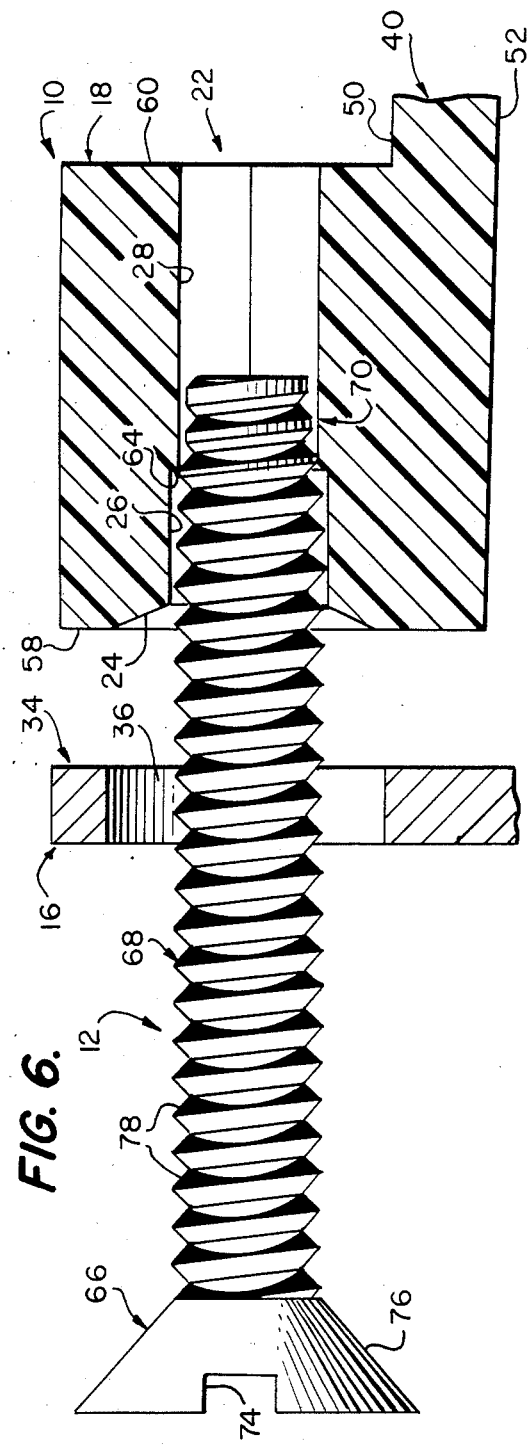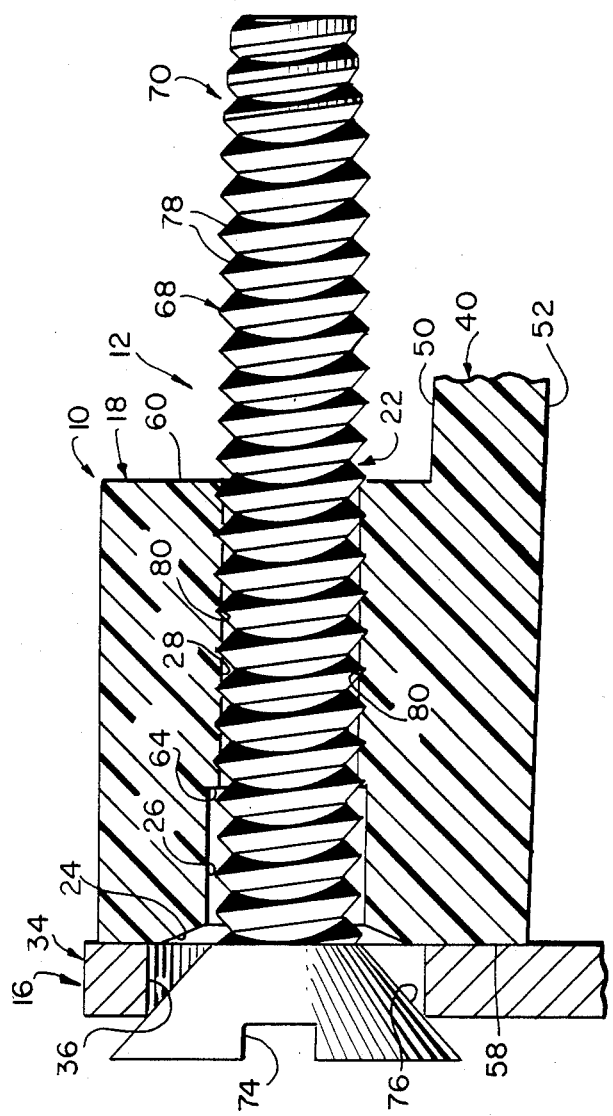

ELECTRICAL OUTLET BOX WITH POLYGONAL MOUNTING BORE

FIELD OF THE INVENTION

The invention relates to an electrical outlet or wiring box formed of nonmetallic material which has a pair of integral bosses that align, engage and retain the mounting screws for wiring devices, electrical fixtures, covers and the like. The bosses each have a polygonal through bore having a diameter across corners slightly larger than the crest diameter of the mounting screw threads, and a diameter across the flat sides slightly smaller than the crest diameter of the screw threads and slightly larger than the root diameter of the screw threads.

BACKGROUND OF THE INVENTION

To conveniently support an electrical wiring device, such as a switch or a receptacle, an electrical lighting fixture, or simply a cover plate, an electrical outlet, or wiring, box is mounted in an opening made in a wall or ceiling and the electrical apparatus or cover plate is fastened to the box by means of two mounting screws. Conventional electrical outlet boxes are stamped from metal and typically have performed internally threaded bores for receiving and threadedly engaging the mounting screws. More recently, these boxes are made from nonmetallic materials, such as thermoplastic compositions, and various spring clips or other extra inserts are used to fasten the mounting screws to the electrical box as the screw passes through a bore formed in each of the box bosses. The longitudinal axis of the bore is substantially perpendicular to the face of the boss. Such bosses include an internal bore which cooperates with the structure of the clip to mount the clip fixedly in the boss. The use of performed threads in the bore is too expensive.

However, the spring clips used for holding mounting screws in nonmetallic boxes have serious disadvantages. For example, the use of clips presents additional inventory which must be accounted for and ultimately increases the cost of manufacturing the electrical box as well as the chance of losing a necessary part. Moreover, the integral bosses sometimes do not adequately hold the mounting screw to the box, and in other cases, the clips may break under screw loading. In addition, these prior art clips do not significantly serve to angularly align the screw with the mounting bore. Thus, the screw may not easily thread straight into the mounting bore when it is rotated. The screwdriver can slide out of the slot in the screw head because there is no means for holding the screw firmly and therefore, it is free to move from side to side.

Examples of these prior art devices regarding outlet boxes as well as other screw retaining assemblies are disclosed in the following U.S. patents: U.S. Pat. Nos. Re. 29,752 to Jaconette, Jr.; 3,263,949 to Conrad; 3,876,821 to Pringle; 3,967,049 to Brandt; 4,025,144 to Thibeault; 4,130,335 to Kinney; 4,295,003 to Borja et al; and 4,355,198 to Gartland, Jr.

Commonly assigned, copending U.S. patent application Ser. No. 616,201, entitled "Electrical Outlet Box With Integral Screw Aligning, Engaging And Retaining Boss" and filed June 1, 1984, to William E. Slater, now U.S. Pat. No. 4,580,689, discloses a nonmetallic box for supporting a device by a screw. The box comprises a boss with a through bore. The through bore has, in sequence from the boss front face, a frustoconical surface, a first cylindrical surface having a diameter slightly larger than the crest diameter of the screw threads, and a second self-tapping cylindrical surface having a diameter slightly smaller than the crest diameter of the screw threads and slightly larger than the root diameter of the screw threads. The subject matter of this copending application is hereby incorporated by reference.

However, the cylindrical self-tapping bore does not function well with the 8-32 and 6-32 machine screws used to secure electrical fixtures in ceiling boxes (e.g., lights, chandeliers, ceiling fans, etc.) and electrical devices in wall boxes (e.g., switches and receptacles), respectively. The relatively fine threads of the machine screws do not self tap well in thermoplastic materials since they "load up" with plastic material, generate relatively high heat from the friction with the plastic material and do not bite and hold well in the plastic material. Additionally, such cylindrical self-tapping bore is difficult to thread, causing fatigue to installers.

U.L. requirements require boxes to have a minimum strip out torque of 12 inch pounds for 6-32 machine screws and 20 inch pounds for 8-32 machine screws. These requirements must be considered along with ease of insertion.

Accordingly, there is a continuing need for improvement in rapidly, easily and economically mounting various types of electrical devices or covers to nonmetallic outlet boxes.

SUMMARY OF THE INVENTION

An object of the present invention is to provide a nonmetallic electrical outlet box with screw receiving, self-tapping bores which are easy to tap with machine mounting screws and securely retain the screws.

Another object of the invention is to provide a nonmetallic electrical outlet box having an integral screw aligning, engaging and retaining boss which requires no extra pieces to secure a mounting screw thereto, thereby decreasing the cost of manufacture, the amount of inventory control needed, and the chance of losing parts thereof.

A further object of the invention is to provide a nonmetallic electrical outlet box that provides a secure installation of a wiring device, fixture, cover plate and the like by means of a strong and durable connection between the mounting screw and the outlet box.

Yet another object of the invention is to provide a nonmetallic outlet box that allows a faster and easier mounting screw installation by reducing the chances of the screw dropping out of the outlet box upon installation.

A still further object of the invention is to provide a nonmetallic outlet box that allows easy, straight threading of the screw into the box and frees the installer's hands from engaging the screw and the device which is to be mounted on the box.

The foregoing objects are basically attained by providing a nonmetallic outlet box for supporting an electrical device by a threaded screw having screw threads with a crest diameter and a root diameter. The outlet box comprises a box integrally formed with the box and having a front face. A straight bore extends inwardly of the boss from the front face for receiving the screw. This bore has a substantially regular polygonal configuration, i.e., the polygon has equal sides and included angles.

This arrangement facilitates insertion of the machine screw, while securely retaining the machine screw in the self-tapped bore. More specifically, this arrangement maximizes the ratio of stripping torque to running or threading torque by only tapping theads in parts of the flat sides of the polygon.

In particular the polygonal configuration has an even number of sides, preferably in the form of a hexagon, and has a diameter across its corners slightly larger than the crest diameter of the screw threads, and a diameter across its flat sides slightly smaller than the crest diameter of the screw threads and slightly larger than the root diameter of the screw threads.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this original disclosure:

FIG. 1 is an exploded right perspective view of a wall outlet box in accordance with the present invention, as well as a wiring device and a pair of mounting screws therefor;

FIG. 2 is an exploded, side elevational view in longitudinal section taken along line 2—2 in FIG. 1 showing the box, the wiring device, and the two mounting screws;

FIG. 3 is an enlarged, partial top plan view of a ceiling outlet box in accordance with the present invention and in particular showing the boss;

FIG. 4 is a partial side elevational plan view in section taken along lines 4—4 in FIG. 3;

FIG. 6 is a side elevational view in longitudinal section similar to that shown in FIG. 5 except that the mounting screw has been received initially in the through bore in the boss, angularly aligned substantially coaxially therewith and engaged thereby to resist inadvertent removal of the screw from the bore; and FIG. 7 is a side elevational view in longitudinal section similar to that shown in FIG. 6 except that the mounting screw has been rotated relative to the boss and is now fully threadedly engaged with the boss, thereby coupling the mounting strap on the wiring device to the boss.

DETAILED DESCRIPTION OF THE PREFERRED EMBODIMENT

Figure 5:
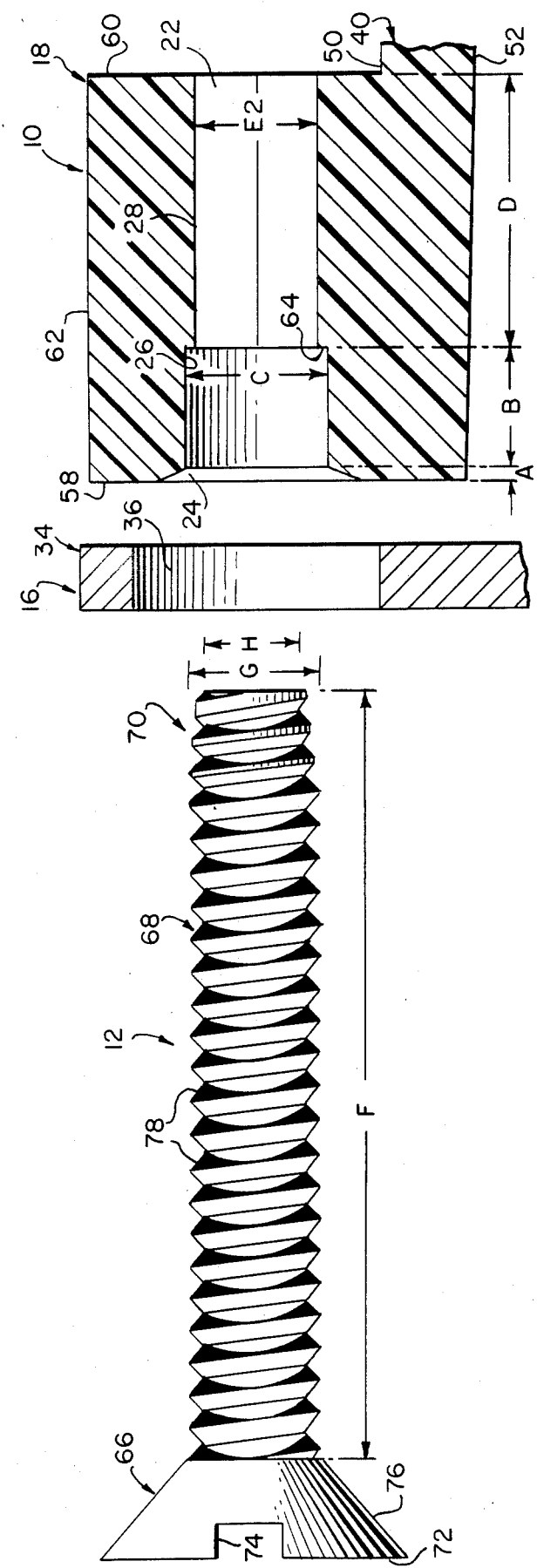
FIG. 5 is an enlarged, exploded side elevational view in longitudinal section, substantially to scale, showing the details of the mounting screw, wiring device mounting strap and boss as seen in FIG. 2.

Referring initially to FIGS. 1 and 2, the electrical outlet or wiring box 10 in accordance with the present invention is intended to be received in an opening in a wall and have rigidly mounted thereto by upper and lower mounting screws 12 and 14, a wiring device 16 in the form of an outlet or receptacle. However, such wiring device could be a switch. Outlet box 10 has upper and lower bosses 18 and 20 integrally formed thereon for aligning, engaging and retaining the mounting screws therein. As described in more detail hereinafter, each boss has a through bore 22 therein which comprises a frustoconical surface 24, a substantially cylindrical surface 26 and a set of planar surfaces 28 defining a regular hexagon in transverse section, in sequence. The combination of these portions of the bore align, engage and retain the screw therein.

Outlet box 10 is formed as a one-piece, unitary integrally molded member from a suitable nonmetallic material, such as a thermoplastic or thermoset composition. An example of such a thermoplastic material is polyvinylchloride or a modified form of polyphenylene oxide resin marketed by General Electric under the tradename "Noryl". An example of such a thermoset material is a phenolic resin. The box is conventionally mounted on a support which may be a floor or wall portion of a structure. The box 10a (see FIGS. 3 and 4) may also be designed to mount a ceiling support. The rear of the outlet box has a plurality of openings, not shown, for receiving electrical wires therethrough, these wires entering the box for electrical connection to, for example, a conventional wiring device 16 or an electrical fixture.

The wiring device 16, which is shown as a dual receptacle, has a pair of terminals 30 and 32 thereon for connection with the electrical wires. The device has a mounting strap 34 is advantageously formed of metal and has an upper elongated aperture 36 near the top and a lower elongated aperture 38 near the bottom. These apertures align with bosses 18 and 20 in the outlet box 10 and receive the mounting screws 12 and 14 therein to rigidly couple the wiring device to the box. As is evident from FIG. 7, the apertures in the mounting strap are large enough in the vertical direction to receive the shank of the screw but are smaller than the head of the screw. The mounting for the fixture is adapted to bosses 18a in circular ceiling box 10a.

As seen in FIGS. 1 and 2, wall outlet box 10 is generally in the form of a parallelopiped with an open front for receiving the wiring device 16 and includes integrally formed top wall 40, bottom wall 42, right side wall 44, left side wall 46 and rear wall 48. Top wall 40 has an upper surface 50 and a lower surface 52. Similarly the bottom wall 42 has an upper surface 54 and a lower surface 56. Upper boss 18 extends outwardly from the upper surface 50 on the top wall 40, while the lower boss 20 extends outwardly from the lower surface 56 on the bottom wall 42.

The upper and lower bosses 18 and 20 are mirror images so only the upper boss 18 will be described in detail. Upper boss 18 has a overall length of about 0.375 inch and a width of about 0.328 inch. It has, as seen in FIG. 5, a planar and vertical front face 58, a planar and vertical rear face 60, and an outer surface 62 which is arcuate on the top, being substantially semicylindrical, and planar on the opposed sides. These planar sides extend substantially tangentially to the semicylindrical portion of the outer surface. The through bore 22 is straight and extends completely through the boss from the front face 58 to the rear face 60 in boss 18. Similarly, bore 22 extends through boss 18a of box 10a.

Each through bore 22 comprises in sequence a frustoconical surface 24 extending inwardly from the front face of the boss, a substantially cylindrical surface 26 extending from the frustoconical surface, and a hexagonal section 28 extending from the cylindrical surface to the rear face of the boss.

The frustoconical surface 24 and the first cylindrical surface 26 form an aligning and engaging portion in the boss. This is essentially a pocket for guiding and angularly aligning the mounting screw substantially coaxially with the through bore and for engaging the screw, upon its initial insertion therein, to resist inadvertent removal of the screw. The hexagonal portion 28 is a screw retaining portion which is self tapping via the threads on the mounting screw 12.

The frustoconical surface 24 includes about 145° and has an axial length A of about 0.015 inch. For 6-32 machine screws, the frustoconical surface tapers inwardly from its largest diameter of about 0.230 inch on the front face 58 to its smallest diameter of about 0.140 inch±0.002 inch at its interface with the cylindrical surface 26. For 8-32 machine screws, the largest diameter is about 0.164 inch, and the smaller diameter is about 0.126 inch±0.002 inch.

The first cylindrical surface 26 is coaxial with the frustoconical surface, and has an axial length B equal to about 0.110 inch and a diameter C of about 0.140 inch for 6-32 screws and about 0.166 inch for 8-32 screws, ±0.002 inch, or more preferably merely +0.002 inch. Advantageously, the axial length of the frustoconical surface and the first cylindrical surface is about 16.667 percent of the overall length F of the screw shank as seen in FIG. 5, and equals about 0.125 inch.

The hexagonal portion 28 is coaxial with the frustoconical surface and the first cylindrical surface and has an axial length D of about 0.250 inch. For an 8-32 machine screws, the hexagon defined by the transverse cross section of portion 28 has a first diameter E1 across its corners of about 0.166 inch±0.002 inch, and a second diameter E2 perpendicularly across its flat sides of about 0.145 inch±0.002 inch. For 6-32 screws E1 is about 0.140 inch±0.002 inch, and E2 is about 0.099 inch±0.002 inch.

Defined at the interface between the cylindrical surface and the hexagonal portion is a shoulder 64 which lies in a plane substantially parallel to the front face 58 of the boss and perpendicular to the longitudinal axes of the through bore 22, the frustoconical surface and the cylindrical surface.

As seen in FIG. 5, the mounting screw 12 includes a head 66 and a threaded shank 68 integrally formed therewith and having a tapered tip 70. The head 66 has a flat circular outer surface 72 interrupted by a diametric slot 74 for receiving a screwdriver and a frustoconical inner surface 76 extending into the shank. The shank 68 is substantially uniform in configuration except for the tapered tip 70, and has an axial length F of about 0.75 inch. The crest diameter G of the 6-32 screw threads 78 is about 0.138 inch, and the root diameter H thereof is about 0.0997 inch. This 0.138 inch crest diameter is a maximum, with the diameter possibly being as small as 0.132 inch due to manufacturing tolerances. For 8-32 machine screws, the crest diameter is 0.1640 inch, and the root diameter is 0.1257 inch.

As illustrated in FIGS. 5-7, the mounting screw 12 is in a form substantially duplicating to scale a No. 6-32 screw which has 32 threads per inch and a crest diameter of about b 0.138 inch and a root diameter of about 0.0997 inch. This is the standard screw typically used in the industry for mounting wiring devices to wall outlet boxes 10. For ceiling outlet boxes 10a, 8-32 machine screws are used.

As is evident from the dimensions discussed above cylindrical surface 26 has a diameter C that is generally slightly larger than the crest diameter G of the screw threads 78. In particular, this slightly larger diameter is about 0.002 inch±0.002 inch. Since it is advantageous to prevent an interference fit between the screw and cylindrical surface 26, the tolerance on the first cylindrical surface is preferably only ±0.002 inch. The hexagonal portion 28 has a first diameter E1 at the corners slightly larger than the crest diameter G of the screw threads, which difference in particular equals an amount of about 0.002 inch. The second diameter E2 across the flatsides of hexagonal portion 28 is slightly larger than the root diameter H of the screw threads, which difference in particular is about 0.0193±0.002 inch larger, and slightly smaller than the crest diameter G by about 0.0190 inch±0.002 inch.

Thus, the shank 68 of the mounting screw can be received in cylindrical surface 26 with a clearance of about 0.001±0.001 inch therebetween around the circumference of the threads. Once the threads are maneuvered into the hexagonal portion 28, these threads self tap the surface of portion 28 forming internal threads in parts only of the planar sides of portion 28, without affecting the parts adjacent the corners. This threadedly retains the screw in the hexagonal portion and prevents removal thereof by application only of an axial force. As seen in FIG. 7, these internal, tapped threads formed in hexagonal portion 28 are designated 80.

The flat sides of hexagonal portion 28 form a plurality of discrete projections extending inwardly toward the center of the bore and separated by spaces adjacent the corners. The inwardly facing surfaces adjacent the corners define a first diameter slightly larger than the screw crest diameter. The innermost, central portions of the flat sides define a second diameter slightly smaller than the screw crest diameter and slightly larger than the screw root diameter.

OPERATION

To connect the wiring device 16 to the outlet box 10, the wiring device is moved adjacent to the box so that the apertures 36 and 38 in the mounting strap 34 are substantially aligned with the through bores 22 in the upper and lower bosses 18 and 20. Typically, the mounting screws 12 and 14 are loosely connected to the mounting straps in the apertures by means of small rectangular paper washers, not shown, so when the wiring device is placed adjacent the bosses, the mounting screws can be inserted into the through bores in the bosses, as seen in FIG. 6, without falling out of the wiring device.

This insertion traverses the frustoconical surface 24, which centers the shank 68 of the screw, and then the cylindrical surface 26, which further centers the screw coaxially with the through bore and angularly aligns the shank substantially coaxially of the through bore. Moreover, insertion of the screw into the cylindrical surface results in an engagement of the screw by this surface, its interface with the frustoconical surface and its interface with the hexagonal portion, thereby resisting inadvertent removal of the screw and allowing the installer to release the screw and wiring device. Further insertion of the screw causes the tapered tip 70 of the shank 68 to traverse a portion of the hexagonal portion 28 until the crests of the threads on the shank spaced from the tapered tip engage the shoulder 64. In this position shown in FIG. 6, the screw is substantially centered and aligned with the through bore and actually remains in the through bore after the screw is pushed therein due to, in addition to engagement by the first cylindrical surface, a slight deformation of the inner section of the shoulder. Hence, the screw tends to remain in the through bore and also tends to remain coaxially aligned therewith so that it can be screwed into the hexagonal portion coaxially aligned therewith and thus avoid an undesirable offset angle. It is highly advantageous to avoid such an offset angle since this may provide unequal thread depth in the threads 80 formed in hexagonal portion 28, thereby reducing the pull-out strength of the screw connection which must be maintained to specific standards.

After the screw is initially inserted into the bore, the screw 12 is then rotated via, for example, a screwdriver received in slot 74 in the head of the screw, with this rotation causing the threads 78 on the screw to deform radially outwardly the hexagonal portion 28 and thereby self tap helical threads 80 in parts only of the planar surfaces of the hexagonal portion. This rotation, and resulting axial progression, of the screw into the hexagonal portion is continued as seen in FIG. 7 until the frustoconical surface 76 on the head engages the mounting strap 34 adjacent the upper and lower edges of aperture 36 and the mounting strap 34 engages the front face 58 of the boss 18. In this position, the shank 68 of the screw extends out of the rear face 60 of the boss. Since the shank 68 of the screw is threadedly engaged with the second cylindrical surface via its threads 78 and the tapped threads 80, application only of an axial force tending to move the screw out of the boss will not remove the screw. Rather, to remove the screw a counter rotation must be provided to the screw and thus the hexagonal 28 provides a very secure coupling of the screw to the boss and therefore the wiring device to the box.

Moreover, since the frustoconical surface and cylindrical surface extend axially about 16.667 percent of the length of the screw shank, a significant aligning capability is provided. In addition, since the hexagonal portion 28 has an axial length of about 66.667 percent of the overall length of the boss, and about twice the length of the cylindrical surface, the hexagonal portion provides a significant coupling action to the screw, thereby providing a very durable connection of the wiring device to the box.

Regarding alignment of the screw substantially coaxially of the bore upon initial insertion of the screw into the bore, it can be calculated, using a radial tolerance of 0.001 inch between the screw and cylindrical surface 26 and a length of 0.110 inch for surface 26, that the maximum angular misalignment of the screw relative to the axis of the bore 22 is about 0.5°, i.e., an angle whose tangent is 0.001 divided by 0.110. Thus, the angular misalignment is quite small, thereby producing self tapped threads 80 of substantially equal depth resulting in maximum pull-out strength of the screw relative to the boss.

Fixtures are attached to ceiling box 10a using 8-32 machine screws in a similar manner.

Test results have shown that the ratio of stripping torque to threading torque is 2:1 for circular bores and 2.2:1 for splined or fluted bores, while such ratio for the hexagonal bore of the present invention is 4:1 with bores in boxes formed of Noryl material. This provides a significant improvement and advantage.

While one advantageous embodiment has been chosen to illustrate the invention, it will be understood by those skilled in the art that various changes and modifications can be made therein without departing from the scope of the invention as defined in the appended claims.

What is claimed is:

1. An electrical box for supporting a device by an externally threaded screw, the screw having threads with a crest diameter and a root diameter, comprising:
   a boss integrally formed with the box and having a front face; and
   a straight self-tapping bore extending inwardly of said boss from said front face for receiving the screw, said bore having a substantially regular polygonal cross-sectional configuration with an even number of sides, said bore having a first diameter across corners of said polygonal configuration slightly larger than the crest diameter of the screw threads, and a second diameter across flat sides of said polygonal configuration slightly smaller than the crest diameter of the screw threads and slightly larger than the root diameter of the screw threads.

2. An electrical box according to claim 1 wherein said polygonal configuration is hexagonal.

3. An electrical box according to claim 2 wherein said first diameter is about 0.166 inch; and said second diameter is about 0.145 inch.

4. An electrical box according to claim 2 wherein said first diameter is 0.166 inch±0.002 inch; and said second diameter is 0.145 inch±0.002 inch.

5. An electrical box according to claim 2 wherein said first diameter is about 0.140 inch; and said second diameter is about 0.099 inch.

6. An electrical box according to claim 2 wherein said first diameter is 0.140 inch±0.002 inch; and said second diameter is 0.099 inch±0.002 inch.

7. An electrical box according to claim 1 wherein said cross-sectional configuration is constant along a first axial length of said bore.

8. An electrical box for supporting a device by an externally threaded screw, the screw having threads with a crest diameter and a root diameter, comprising:
   a boss integrally formed with the box and having a front face; and
   a straight self-tapping bore extending inwardly of said boss from said front face for receiving the screw, said bore having, in sequence from said front face,
   a downwardly and inwardly tapered, substantially frustoconical surface,
   a cylindrical surface coaxial with said frustoconical surface and having a diameter at least substantially equal to the crest diameter of the screw threads, and
   a substantially regular polygonal cross-sectional configuration, said polygonal configuration having an even number of sides.

9. A nonmetallic box according to claim 8 wherein said bore has a first diameter across corners of said polygonal configuration slightly larger than the crest diameter of the screw threads, and a second diameter across flat sides of said polygonal configuration slightly smaller than the crest diameter of the screw threads and slightly larger than the root diameter of the screw threads.

10. A nonmetallic box according to claim 8 wherein said cylindrical surface and said polygonal cross-sectional configuration define at the interface a shoulder.

11. A nonmetallic box according to claim 8, wherein said shoulder is planar and lies in a plane substantially perpendicular to an axis of said cylindrical surface.

12. A nonmetallic box according to claim 1 wherein said bore comprises, adjacent said front face, a downwardly and inwardly tapered, substantially frustoconical surface.

13. An electrical box for supporting a device by an externally threaded screw, the screw having threads with a crest diameter and a root diameter, comprising:
- a boss integrally formed with the box and having a front face; and
- a straight self-tapping bore extending inwardly of said boss from said front face for receiving the screw, said bore having a substantially regular polygonal cross-sectional configuration and a cylindrical surface between said front face and said polygonal cross-sectional configuration, said cylindrical surface having a diameter at least substantially equal to the crest diameter of the screw threads.

14. A nonmetallic box for supporting a device by a threaded screw having screw threads with a crest diameter and a root diameter, comprising:
- a boss integrally formed with the box and having a front face and a rear face; and
- a through bore extending between said faces for receiving the screw, said bore including in sequence from said front face to said rear face,
    - a downwardly and inwardly tapered, substantially frustoconical surface,
    - a substantially cylindrical surface coaxial with said frustoconical surface and having a diameter at least substantially equal to the crest diameter of the screw threads, and
    - a set of planar surfaces coaxial with said cylindrical surface essentially defining a regular polygon in transverse cross section with an even number of sides and having a first diameter across corners of said polygon slightly larger than the crest diameter of the screw threads and a second diameter across flat-sides of said polygon slightly smaller than the crest diameter of the screw threads and slightly larger than the root diameter of the screw threads.

15. A nonmetallic box according to claim 14 wherein said regular polygon is a hexagon.

16. An electrical box for supporting a device by an externally threaded screw, the screw having threads with a crest diameter and a root diameter, comprising:
- a boss integrally formed with the box and having a front face; and
- a straight self-tapping bore extending inwardly of said boss from said front face for receiving the screw, said bore having a plurality of discrete, inwardly extending projections separated by spaces, said spaces being defined by inwardly facing surfaces defining a first diameter slightly larger than the crest diameter of the screw threads, innermost surfaces of said projections defining a second diameter slightly smaller than the crest diameter of the screw threads and slightly larger than the root diameter of the screw threads, said bore also including a cylindrical surface between said front face and said projections, said cylindrical surface having a diameter at least substantially equal to and only slightly larger than the crest diameter of the screw threads such that said cylindrical surface holds the screw in coaxial alignment with said first and second diameters.

17. An electrical box according to claim 16 wherein said projections are flat sides of a bore portion having a substantially regular polygonal cross-sectional configuration; and said spaces are corners of said polygonal cross-sectional configuration.

18. An electrical box according to claim 17 wherein polygonal configuration is hexagonal.

19. An electrical box according to claim 16 wherein said cylindrical surface has an axial length of about 0.110 inch.

20. An electrical box according to claim 16 wherein said cylindrical surface has a transverse diameter of about 0.140 inch.

21. An electrical box according to claim 16 wherein said cylindrical surface has a transverse diameter of about 0.116 inch.

* * * * *

UNITED STATES PATENT AND TRADEMARK OFFICE
CERTIFICATE OF CORRECTION

PATENT NO. : 4,666,055
DATED : May 19, 1987
INVENTOR(S) : Thomas E. Lewis

It is certified that error appears in the above—identified patent and that said Letters Patent is hereby corrected as shown below:

Column 8, lines 51, 59, 62 and 65, "A nonmetallic", each occurance, should read -- An electrical --.

Signed and Sealed this

Twenty-second Day of September, 1987

Attest:

DONALD J. QUIGG

Attesting Officer       Commissioner of Patents and Trademarks